United States Patent
Ramachandran et al.

(10) Patent No.: US 7,601,797 B2
(45) Date of Patent: Oct. 13, 2009

(54) METHOD OF CONTROLLED ALCOHOLYSIS AND REGENERATION OF A BOROHYDRIDE

(75) Inventors: P. Veeraraghavan Ramachandran, West Lafayette, IN (US); Debasis Hazra, West Lafayette, IN (US); Bhimapaka China Raju, West Lafayette, IN (US); Venkatram Reddy Mereddy, Duluth, MN (US); Annyt Bhattacharyya, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 643 days.

(21) Appl. No.: 11/125,796

(22) Filed: May 10, 2005

(65) Prior Publication Data

US 2005/0255024 A1  Nov. 17, 2005

Related U.S. Application Data

(60) Provisional application No. 60/651,704, filed on Feb. 9, 2005, provisional application No. 60/571,405, filed on May 14, 2004.

(51) Int. Cl.
*C08G 78/08* (2006.01)
*C01B 35/10* (2006.01)

(52) U.S. Cl. .................................... 528/394; 423/277
(58) Field of Classification Search ................ 528/394
See application file for complete search history.

(56) References Cited

U.S. PATENT DOCUMENTS

| | | | | |
|---|---|---|---|---|
| 2,939,762 | A | * | 6/1960 | Berner et al. ............... 423/288 |
| 3,254,129 | A | * | 5/1966 | Brown ............................ 568/1 |
| 6,586,563 | B1 | * | 7/2003 | Ortega et al. ................ 528/394 |
| 2001/0022960 | A1 | | 9/2001 | Kojima et al. |
| 2001/0045364 | A1 | | 11/2001 | Hockaday et al. |
| 2002/0182459 | A1 | | 12/2002 | Hockaday et al. |
| 2003/0009942 | A1 | | 1/2003 | Amendola et al. |
| 2003/0014917 | A1 | | 1/2003 | Rusta-Sallehy et al. |
| 2003/0037487 | A1 | | 2/2003 | Amendola et al. |

* cited by examiner

*Primary Examiner*—James O. Wilson
*Assistant Examiner*—Ebenezer Sackey
(74) *Attorney, Agent, or Firm*—Brinks Hofer Gilson & Lione

(57) ABSTRACT

Methods of controlled hydrolysis/alcoholysis and regeneration of a borohydride are disclosed. Examples of the present invention show that hydrolysis of sodium borohydride or lithium borohydride with dilute acid provides simultaneous generation of $H_2$ and boric acid for recycling. Other examples of the present invention show methods for regenerating a borohydride by reacting an aluminum hydride to a borate compound to provide a regenerated borohydride.

16 Claims, No Drawings

METHOD OF CONTROLLED ALCOHOLYSIS AND REGENERATION OF A BOROHYDRIDE

CROSS-REFERENCE TO RELATED APPLICATIONS

This application claims the benefit of U.S. provisional application No. 60/571,405, filed on May 14, 2004, entitled "METHOD OF CONTROLLED HYDROLYSIS AND REGENERATION OF SODIUM BOROHYDRIDE," the entire contents of which are incorporated herein by reference.

This application also claims the benefit of U.S. provisional application No. 60/651,704, filed on Feb. 9, 2005, entitled "METHOD OF GENERATING A BOROHYDRIDE," the entire contents of which are incorporated herein by reference.

FIELD OF THE INVENTION

The present invention relates to methods of generating hydrogen from sodium borohydride or lithium borohydride and regenerating a borohydride.

BACKGROUND OF THE INVENTION

The discovery of sodium borohydride (SBH) (see equations 1-4 below) paved way for an efficient method for the generation of hydrogen. The hydrolysis of SBH in water (see equation 2) is slow, which is suppressed further by the addition of sodium hydroxide. The hydrolysis can be accelerated by the addition of mineral acids or catalytic amounts of metal halides (see equations 3 and 4). The active catalyst is believed to be the metal borides and the reaction is highly exothermic. As discussed, the stoichiometric equations are as follows:

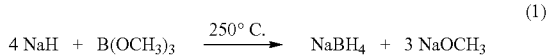
(1)

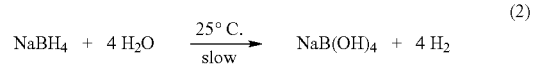
(2)

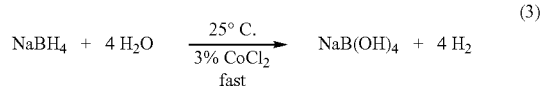
(3)

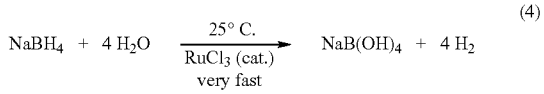
(4)

Hydrogen is currently the environmentally desirable fuel of choice that can be used in internal combustion engines or electrochemically oxidized efficiently in proton exchange membrane (PEM), or other types of fuel cells. Current available hydrogen storage processes are adequate, but either may be improved in efficiency or are relatively not practical for widespread usage. Accordingly, there is an interest in research initiated by H. C. Brown regarding ruthenium-mediated process and other methods for the generation of hydrogen from sodium borohydride. Several applications are known and have appeared in the literature. However, there are issues that should be addressed or improved upon before sodium borohydride becomes an alternate for the currently available sources of energy. For example, controlling the relatively high exothermic nature of the metal halide-catalyzed hydrolysis of sodium borohydride and the efficient recycling of the resultant borate to sodium borohydride would be useful for the success of sodium borohydride as an effective hydrogen source for a wide variety of applications, such as distributed power generation and transportation.

BRIEF SUMMARY OF THE INVENTION

The present invention addresses the above issues and provides an efficient procedure for the controlled generation of hydrogen from sodium borohydride or lithium borohydride as well as an effective protocol for the regeneration of sodium borohydride or lithium borohydride.

One example of the present invention includes a method of hydrolysis or alcoholysis wherein hydrogen is generated at a relatively controlled rate and without generating excess heat. In this example, heat is supplied to the reactants for release of the hydrogen. In another example, the alcoholysis includes a reaction of sodium borohydride and ethylene glycol in alcohol solution rather than aqueous solution. The cyclic borate is recovered quantitatively from alcohol, e.g., tert-butanol, for the regeneration of sodium borohydride.

In another example, the present invention provides a method of regenerating a borohydride, the method comprises preparing a borate compound derived from alcoholysis of the borohydride. The method further includes reacting an aluminum hydride to the borate compound in a solvent to provide regenerated borohydride.

Further objects, features, and advantages of the present invention will become apparent from consideration of the following description and the appended claims when taken in connection with the accompanying drawings.

DETAILED DESCRIPTION OF THE INVENTION

Examples of the present invention show that hydrolysis (or alcoholysis) of sodium borohydride (or lithium borohydride) with dilute acid provides simultaneous generation of $H_2$ and boric acid for recycling. Utilization of diols affords a controlled release of hydrogen with the concomitant formation of the corresponding cyclic sodium or lithium borates. In turn, the cyclic borate esters may be recycled to sodium borohydride or lithium borohydride.

An example of the present invention comprises a method of controlled alcoholysis of a borohydride, e.g., sodium borohydride, and a method of regenerating the borohydride. The method of controlled alcoholysis comprises preparing a predetermined volume percentage of a diol in alcohol solution with trace amounts of catalyst to form a diol-catalyst mixture. The method further comprises adding the borohydride to the diol-catalyst mixture at a predetermined mole ratio to provide a cyclic borate ester and alcoholysis of the borohydride. From this method, regeneration of the borohydride may be achieved. The method of regenerating the borohydride comprises reacting aluminum hydride to the cyclic borate ester in a solvent to provide regenerated borohydride.

Generation of Hydrogen

In one example, the present invention provides one method for controlled alcoholysis in accordance with one example of the present invention. The method includes preparing a predetermined volume percentage of a diol in alcohol solution with trace amounts of a catalyst to form a diol-catalyst mixture. Preferably, the predetermined volume percentage of the diol in alcohol solution is between about 5% and 50% volume ethanediol in a tert-butanol solution. In this example, the trace amounts of the catalyst preferably comprise between about 0.1% and 0.001% volume Lewis/Bronsted acid catalyst. The diol-catalyst mixture is preferably heated to between about 40° Celsius (C.) and 60° C.

In this embodiment, the method further includes adding sodium borohydride to the diol-catalyst mixture at a predetermined mole ratio. As a result, the reactants produce a cyclic borate ester and hydrogen from alcoholysis of sodium borohydride. Preferably, the mole ratio between the sodium borohydride and the diol-catalyst mixture, e.g., ethanediol-Lewis/Bronsted acid mixture, is at about a 1:2 mole ratio. When ethanediol in a tert-butanol solution are used in this example, the reaction produces sodium tetraalkoxyborate and hydrogen upon controlled alcoholysis of sodium borhydride. Although not wanting to be limited by theory, it is believed that the formation of the cyclic borate ester is sufficiently stable to allow the achievement of the reaction.

The diol of the present invention is preferably aqueous 1,2-ethanediol (ethylene glycol). However, other suitable diols may be used without falling beyond the scope or spirit of the present invention. For example, other diols may include 1,3-propane diol, 2-butene-1,4-diol, or catechol may be used. The acid is preferably hydrochloric acid (HCl). However, other suitable Lewis acids as the catalyst may be used without falling beyond the scope or spirit of the present invention. For example, other Lewis acids may include $Sc(OTf)_3$, $RuCl_3$, $FeCl_3$, $CeCl_3$, $MgCl_2$, $ZnCl_2$, $MnSO_4$, $FeSO_4$, $CuSO_4$, $Ni(OCOCH_3)_2$, or $H_3BO_3$ as catalysts for the alcoholysis of sodium borohydride with ethane diol.

The diol used may be preformed with at least about 5% volume of aqueous ethylene glycol (v/v), preferably between about 5% and 50% volume of aqueous ethylene glycol (v/v). The temperature of the diol may range between about ambient or room temperature and about 60° C. In particular, the reactions were performed with 5%, 20%, 30%, and 50% aqueous ethylene glycol (v/v) at room temperature and at 60° C. The results are summarized in Table 1 below.

In another example, the reaction was carried out in a water bath. Although not wanting to be limited by theory, it is believed that the use of the water bath, as a result, slowed down or decreased the rate of the reaction and facilitated in releasing all of the hydrogen within about 35 min. Indeed, the addition of sodium borohydride to excess 1,2-ethanediol without the water bath liberated quantitative hydrogen ($H_2$) within about 5 min, a reaction that was observed to be relatively vigorous and exothermic. The $^{11}B$ NMR (backscattered nuclear magnetic resonance) spectroscopy showed a spectrum at δ 8.9 ppm corresponding to the cyclic borate ester shown in equation 5. Treatment of the cyclic borate ester with water revealed an additional peak in the $^{11}B$ NMR spectrum at δ 5.8 ppm, corresponding to the resulting species shown in equation 5.

(5)

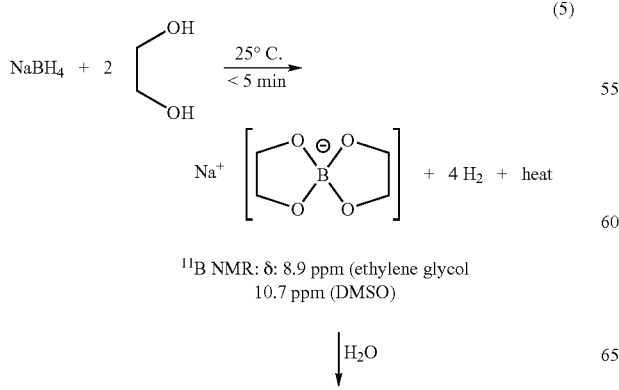

$^{11}B$ NMR: δ: 8.9 ppm (ethylene glycol
10.7 ppm (DMSO)

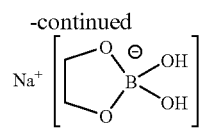

$^{11}B$ NMR: δ: 5.8 ppm (6)

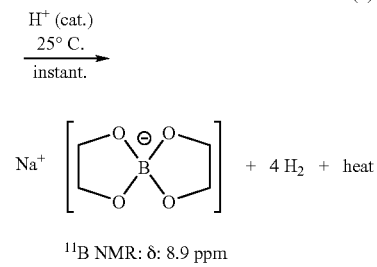

$^{11}B$ NMR: δ: 8.9 ppm (7)

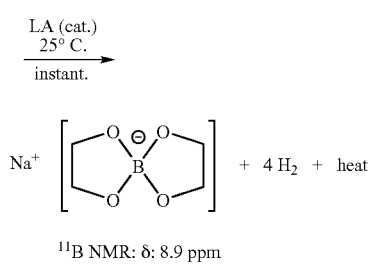

$^{11}B$ NMR: δ: 8.9 ppm

LA = Lewis acid: $Sc(OTf)_3$, $RuCl_3$, $B(OH)_3$, etc.

In other examples, other diols may be used as mentioned above. For example, the following diols may be used: 1,3-propanediol, 2-butene-1,4-diol, and catechol. Molecules A, B, and C below show the cyclic borate esters produced when 1,3-propanediol, 2-butene-1,4-diol, and catechol, respectively, were used.

A

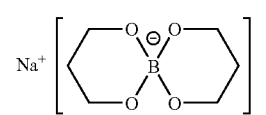

$^{11}B$ NMR (DMSO): δ: 1.2 ppm

B

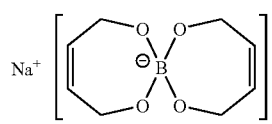

$^{11}B$ NMR (DMSO): δ: 5.2 ppm

C

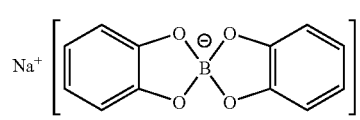

$^{11}B$ NMR (DMSO): δ: 14.5 ppm

As shown in Tables 1-3, the reaction is relatively slow at room temperature and the rate of the alcoholysis/hydrolysis increases with increasing percentage of the diol at higher temperatures. The reaction becomes an instantaneous reaction with 50% of ethylene glycol. With this reaction, it has been shown that hydrogen ($H_2$) can be released/generated from sodium borohydride instantaneously under controlled condition by supplying heat. This observation is in sharp contrast with the instantaneous exothermic reaction under neat conditions (without water) in ethylene glycol and under the present conditions used in the Hydrogen on Demand™ protocol as known in the art, requiring heat exchangers for the performance of the fuel cell.

TABLE 1

Controlled Generation of Hydrogen from SBH and Aqueous Ethylene Glycol Solution[a]

| Entry | Ethylene glycol Conc., % | Temperature, °C. | Time, min | Yield of $H_2$, % |
|---|---|---|---|---|
| 1 | 20 | 60 | 9 | 50 |
| 2 | 20 | 60 | 27 | 75 |
| 3 | 20 | 60 | 80 | 100 |
| 4 | 30 | 60 | 6 | 50 |
| 5 | 30 | 60 | 19 | 75 |
| 6 | 30 | 60 | 90 | 100 |
| 7 | 50 | 60 | 4 | 50 |
| 8 | 50 | 60 | 12 | 75 |
| 9 | 50 | 60 | 90 | 100 |

[a]All of the reactions were carried out with two equiv of ethylene glycol.

TABLE 2

Controlled Generation of Hydrogen from SBH and Aqueous Ethylene Glycol Solution in the presence of Catalytic $H_2SO_4$.[a]

| Entry | Ethylene glycol Conc., % | Temperature, °C. | Time, min | Yield of $H_2$, % |
|---|---|---|---|---|
| 1 | 5[b] | RT | 330 | 100 |
| 2 | 5 | 60 | 45 | 100 |
| 3 | 20[c] | RT | 240 | 87 |
| 4 | 20 | 60 | 2.5 | 50 |
| 5 | 20 | 60 | 18 | 75 |
| 6 | 20 | 60 | 40 | 100 |
| 7 | 30 | 60 | 1 | 50 |
| 8 | 30 | 60 | 5 | 75 |
| 9 | 30 | 60 | 40 | 100 |
| 10 | 50 | RT | 210 | 92 |
| 11 | 50 | 60 | 0.25 | 50 |
| 12 | 50 | 60 | 1 | 75 |
| 13 | 50 | 60 | 15 | 100 |

[a]All of the reactions were carried out with two equiv of ethylene glycol unless otherwise stated. 1 drop of 10% $H_2SO_4$ was used as catalyst.
[b]6 equiv of ethylene glycol was used.
[c]4 equiv of ethylene glycol was used.

TABLE 3

Controlled Generation of Hydrogen from Sodium Borohydride and Aqueous Acidic Ethylene Glycol Solution.[a]

| Entry | $H_2SO_4$, % | Ethylene glycol Conc., % | Temperature, °C. | Time, min | Yield of $H_2$, % |
|---|---|---|---|---|---|
| 1 | 1 | 50 | RT[b] | inst. | 98 |
| 2 | 1 | 50 | RT[b] | 2 | 100 |
| 3 | 1 | 50 | RT[c] | 1 | 50 |
| 4 | 1 | 50 | RT[c] | 3.5 | 175 |
| 5 | 1 | 50 | RT[c] | 130 | 100 |
| 6 | 1 | 50 | 40 | 0.75 | 75 |
| 7 | 1 | 50 | 40 | 22 | 100 |
| 8 | 1 | 50 | 60 | 1 | 98 |
| 9 | 1 | 50 | 60 | 2 | 100 |
| 10 | 0.5 | 30 | RT[b] | 1 | 30 |
| 10 | 0.5 | 30 | RT[b] | 10 | 90 |
| 10 | 0.5 | 30 | RT[b] | 50 | 100 |
| 11 | 0.5 | 30 | RT[c] | 1 | 15 |
| 11 | 0.5 | 30 | RT[c] | 10 | 75 |
| 11 | 0.5 | 30 | RT[c] | 75 | 100 |
| 12 | 0.5 | 30 | 60 | 1 | 90 |
| 13 | 0.5 | 30 | 60 | 4 | 100 |
| 14 | 0.5 | 50 | 60 | 1 | 90 |
| 15 | 0.5 | 50 | 60 | 8 | 100 |

[a]All of the reactions were carried out with two equiv of ethylene glycol.
[b]The reaction was allowed to warm.
[c]The reaction flask was cooled with water at room temperature.

EXAMPLE 1

General Procedure for Alcoholysis of Sodium Borohydride with 1,2-Ethanediol in the Presence of Catalytic Acid This example provides a method for generating hydrogen from sodium borohydride to be used in hydrogen generators. In this example, a stirred mixture was prepared comprising 100 mg of sodium borohydride at 2.64 mmol and a drop of an acid (3N hydrochloric acid). Then, 0.6 mL of ethylene glycol at 10.28 mmol was added to the stirred mixture. Vigorous evolution of $H_2$ gas was observed. The reaction was instantaneous, taking about 40 seconds. The $H_2$ evolved was collected in an analytical gas burette. Yield of $H_2$ was quantitative.

The above reaction was repeated separately with $Sc(OTf)_3$, $RuCl_3$, $FeCl_3$, $CuSO_4$, $HgCl_2$, $FeSO_4$, and $Ni(OAc)_2$ as Lewis acids and an instantaneous reaction was also observed in all of the cases. These reactions were instantaneous and took between about 35 and 50 seconds for the completion of the alcoholysis. Moreover, other Lewis acids were used as follows: $MnSO_4$, $MgCl_2$, $ZnCl_2$, $CeCl_3$, and silica gel. These Lewis acids took between about 35 and 50 seconds for the completion of the alcoholysis.

EXAMPLE 2

Alcoholysis with 1,2-Ethanediol in the Presence of Catalytic Hydrochloric Acid

In this example, a stirred mixture was prepared comprising 100 mg of sodium borohydride at 2.64 mmol and 0.3 mL of ethylene glycol at 5.29 mmol. Then, a drop of hydrochloric acid (3N) was added. Vigorous evolution of $H_2$ gas was observed. The reaction was instantaneous and the $H_2$ evolved was collected in an analytical gas burette. Yield of $H_2$ was quantitative (about 100%).

EXAMPLE 3

Alcoholysis with 1,2-Ethanediol in the Presence of Catalytic $H_2SO_4$

In this example, a stirred mixture was prepared comprising 100 mg of sodium borohydride at 2.64 mmol and 0.3 mL of ethylene glycol at 5.29 mmol. Then, a drop of 10% volume $H_2SO_4$ was added. Vigorous evolution of $H_2$ gas was observed. The reaction was instantaneous and the $H_2$ evolved was collected in an analytical gas burette. Yield of $H_2$ was quantitative.

The above experiment was repeated with one drop of 0.1% $H_2SO_4$. The reaction took about 5 seconds to get initiated and then it became vigorous. The reaction was complete in about 10 seconds and the yield of $H_2$ was quantitative.

EXAMPLE 4

Alcoholysis with 1,2-Ethanediol in the Presence of Catalytic $HNO_3$

In this example, a stirred mixture was prepared comprising 100 mg of sodium borohydride at 2.64 mmol and 0.3 mL of ethylene glycol at 5.29 mmol. Then, a drop of 10% by volume $HNO_3$ was added. Vigorous evolution of $H_2$ gas was observed. The reaction was instantaneous and the $H_2$ evolved was collected in an analytical gas burette. Yield of $H_2$ was quantitative.

EXAMPLE 5

Alcoholysis with 1,2-Ethanediol in the Presence of Catalytic Acetic Acid

In this example, a stirred mixture was prepared comprising 100 mg of sodium borohydride at 2.64 mmol and 0.3 mL of ethylene glycol at 5.29 mmol. A drop of acetic acid was then added. Vigorous evolution of $H_2$ gas was observed. The reaction was instantaneous and the $H_2$ evolved was collected in an analytical gas burette. Yield of $H_2$ was quantitative.

EXAMPLE 6

Alcoholysis with 1,2-Ethanediol in the Presence of Catalytic Propionic Acid

In this example, a stirred mixture was prepared comprising 100 mg of sodium borohydride at 2.64 mmol and 0.3 mL of ethylene glycol at 5.29 mmol. A drop of propionic acid was then added. Vigorous evolution of $H_2$ gas was observed. The reaction was instantaneous and the $H_2$ evolved was collected in an analytical gas burette. Yield of $H_2$ was quantitative.

EXAMPLE 7

Alcoholysis with 1,2-Ethanediol in the Presence of Catalytic Ammonium Chloride

In this example, a stirred mixture was prepared comprising 100 mg of sodium borohydride at 2.64 mmol and a pinch of ammonium chloride. Then, 0.6 mL of ethylene glycol at 10.28 mmol was added to the stirred mixture. Vigorous evolution of $H_2$ gas was observed. The reaction was instantaneous and the $H_2$ evolved was collected in an analytical gas burette. Yield of $H_2$ was quantitative.

EXAMPLE 8

Alcoholysis with 1,2-Ethanediol in the Presence of Catalytic Oxalic Acid

In this example, a stirred mixture was prepared comprising 100 mg of sodium borohydride at 2.64 mmol and a pinch of oxalic acid. Then, 0.6 mL of ethylene glycol at 10.28 mmol was added to the stirred mixture. Vigorous evolution of $H_2$ gas was observed. The reaction was instantaneous and the $H_2$ evolved was collected in an analytical gas burette. Yield of $H_2$ was quantitative.

EXAMPLE 9

Alcoholysis with 1,2-Ethanediol in the Presence of Catalytic Boric Acid

In this example, a stirred mixture was prepared comprising 100 mg of sodium borohydride at 2.64 mmol and a pinch of boric acid. Then, 0.6 mL of ethylene glycol at 10.28 mmol was added to the stirred mixture. Vigorous evolution of $H_2$ gas was observed. The reaction was instantaneous and the $H_2$ evolved was collected in an analytical gas burette. Yield of $H_2$ was quantitative.

EXAMPLE 10

Alcoholysis with 1,2-Ethanediol in the Presence of Catalytic Benzoic Acid

In this example, a stirred mixture was prepared comprising 100 mg of sodium borohydride at 2.64 mmol and a pinch of benzoic acid. Then, 0.6 mL of ethylene glycol at 10.28 mmol was added to the stirred mixture. Vigorous evolution of $H_2$ gas was observed. The reaction was instantaneous and the $H_2$ evolved was collected in an analytical gas burette. Yield of $H_2$ was quantitative.

EXAMPLE 11

Alcoholysis with 1,2-Ethanediol in the Presence of Catalytic p-TsOH

In this example, a stirred mixture was prepared comprising 100 mg of sodium borohydride at 2.64 mmol and a pinch of p-TsOH. Then, 0.6 mL of ethylene glycol at 10.28 mmol was added to the stirred mixture. Vigorous evolution of $H_2$ gas was observed. The reaction was instantaneous and the $H_2$ evolved was collected in an analytical gas burette. Yield of $H_2$ was quantitative.

EXAMPLE 12

Alcoholysis with 1,2-Ethanediol in the Presence of Catalytic Phenol

In this example, a stirred mixture was prepared comprising 100 mg of sodium borohydride at 2.64 mmol and a pinch of phenol. Then, 0.6 mL of ethylene glycol at 10.28 mmol was added to the stirred mixture. Vigorous evolution of $H_2$ gas was observed. The reaction was instantaneous and the $H_2$ evolved was collected in an analytical gas burette. Yield of $H_2$ was quantitative.

EXAMPLE 13

Alcoholysis with 1,2-Ethanediol in the Presence of Catalytic 3-Benzoylpropionic Acid In this example, a stirred mixture was prepared comprising 100 mg of sodium borohydride at 2.64 mmol and a pinch of 3-benzoylpropionic acid. Then, 0.6 mL of ethylene glycol at 10.28 mmol was added to the stirred mixture. Vigorous evolution of $H_2$ gas was observed. The reaction was instantaneous and the $H_2$ evolved was collected in an analytical gas burette. Yield of $H_2$ was quantitative.

EXAMPLE 14

Alcoholysis of Sodium Borohydride with 1,3-Propanediol

In this example, 0.57 mL of 1,3-propanediol at 7.93 mmol was added to 100 mg of sodium borohydride at 2.64 mmol. Hydrogen evolution initially started slowly for about 5 seconds and then the reaction became exothermic and vigourous. The reaction was complete in about 7 minutes. The $H_2$ was collected in an analytical gas burette. Yield of $H_2$ was 91%. The $^{11}B$ spectrum in DMSO-$D_6$ revealed a peak at $\delta$ 1.21 ppm. The above experiment was repeated in presence of 1 drop of 10% $H_2SO_4$. The reaction was complete in one minute and $H_2$ yield was 96%.

EXAMPLE 15

Alcoholysis of Sodium Borohydride with 2-Butene-1,4-Diol

In this example, 0.65 mL of 2-butene-1,4-diol at 7.93 mmol was added to 100 mg of sodium borohydride at 2.64 mmol. Hydrogen evolution initially started slowly for about 5 seconds and then the reaction became exothermic and vigourous. The reaction was complete in about 5 minutes. The $H_2$ was collected in an analytical gas burette. Yield of $H_2$ was 93%. $^{11}B$ NMR in DMSO-$D_6$ $\delta$ 5.17 ppm; $^1H$ in DMSO-$D_6$ $\delta$ 3.82 ($CH_2$), 5.44 ppm (CH); $^{13}C$ in DMSO-$D_6$ at $\delta$ 59.23 and 131.16 ppm. The above experiment was repeated in presence of 1 drop of 10% $H_2SO_4$. The reaction was complete in one minute and $H_2$ yield was 97%.

EXAMPLE 16(a)

Reaction of Sodium Borohydride with Aqueous Solution of Ethylene Glycol in Presence of Catalytic Amount of $H_2SO_4$ with 5% Ethylene Glycol at Room Temperature In this example, a stirred mixture was prepared comprising 100 mg of sodium borohydride at 2.64 mmol and 5% by volume aqueous solution of ethylene glycol (17.8 mL, 15.87 mmol). Then, a drop of 10% $H_2SO_4$ was added to the stirred mixture. Instant evolution of $H_2$ gas was observed. The reaction mixture was stirred at room temperature for about 5 hours and 30 minutes. The $H_2$ evolved was collected in an analytical gas burette. Yield of $H_2$ was quantitative.

EXAMPLE 16(b)

Reaction of Sodium Borohydride with Aqueous Solution of Ethylene Glycol in Presence of Catalytic Amount of $H_2SO_4$ with 5% Ethylene Glycol at 60° Celsius In this example, a stirred mixture was prepared comprising 100 mg of sodium borohydride at 2.64 mmol and 5% by volume aqueous solution of ethylene glycol (17.8 mL, 15.87 mmol). The stirred mixture was placed on a preheated oil bath at 60° C. Then, a drop of 10% $H_2SO_4$ was added to the stirred mixture. Instant evolution of $H_2$ gas was observed. The reaction mixture was then stirred at 60° C. for 45 min. The $H_2$ evolved was collected in an analytical gas burette. Yield of $H_2$ was quantitative.

EXAMPLE 17(a)

Reaction of Sodium Borohydride with Aqueous Solution of Ethylene Glycol in Presence of Catalytic Amount of $H_2SO_4$ with 20% Ethylene Glycol at Room Temperature In this example, a stirred mixture was prepared comprising 100 mg of sodium borohydride at 2.64 mmol and 20% by volume aqueous solution of ethylene glycol (3 mL, 10.58 mmol). Then, a drop of 10% $H_2SO_4$ was added to the stirred mixture. Instant evolution of $H_2$ gas was observed. The reaction mixture was stirred at room temperature for about 4 hours. The $H_2$ evolved was collected in an analytical gas burette. Yield of $H_2$ was 87%.

EXAMPLE 17(b)

Reaction of Sodium Borohydride with Aqueous Solution of Ethylene Glycol in Presence of Catalytic Amount of $H_2SO_4$ with 20% Ethylene Glycol at 60° C.

In this example, a stirred mixture was prepared comprising 100 mg of sodium borohydride at 2.64 mmol and 20% by volume aqueous solution of ethylene glycol (1.5 ml, 5.29 mmol). The stirred mixture was placed on a pre-heated oil bath at 60° C. Then, a drop of 10% $H_2SO_4$ was added to the stirred mixture. Instant evolution of $H_2$ gas was observed. The reaction mixture was stirred at about 60° C. for about 40 minutes. The $H_2$ evolved was collected in an analytical gas burette. Yield of $H_2$ was quantitative. The yield of hydrogen is as follows: about 50% $H_2$ was liberated in about 2 minutes, 30 seconds, about 75% in about 18 minutes, and about 100% in about 40 minutes.

EXAMPLE 17(c)

Reaction of Sodium Borohydride with Aqueous Solution of Ethylene Glycol in Presence of Catalytic Amount of $H_2SO_4$ with 30% Ethylene Glycol at 60° C.

In this example, a stirred mixture was prepared comprising 100 mg of sodium borohydride at 2.64 mmol and 30% by volume aqueous solution of ethylene glycol (1 ml, 5.29 mmol). The stirred mixture was placed on a pre-heated oil bath at 60° C. Then, a drop of 10% $H_2SO_4$ was added to the stirred mixture. Instant evolution of $H_2$ gas was observed. The reaction mixture was stirred at about 60° C. for 40 min. The $H_2$ evolved was collected in an analytical gas burette. Yield of $H_2$ was quantitative. The yield of hydrogen is as follows: about 50% $H_2$ was liberated in about 1 minute, about 75% in about 5 minutes, and about 100% in about 40 minutes.

EXAMPLE 18(a)

Reaction of Sodium Borohydride with Aqueous Solution of Ethylene Glycol in Presence of Catalytic Amount of $H_2SO_4$ with 50% Ethylene Glycol at Room Temperature In this example, a stirred mixture was prepared comprising 100 mg of sodium borohydride at 2.64 mmol and 50% by volume aqueous solution of ethylene glycol (0.6 ml, 5.29 mmol). Then, a drop of 10% $H_2SO_4$ was added to the stirred mixture. Instant evolution of $H_2$ gas was observed. The reaction mixture was stirred at room temperature for about 3 hours and 30 minutes. The $H_2$ evolved was collected in an analytical gas burette. Yield of $H_2$ was about 92%.

EXAMPLE 18(b)

Reaction of Sodium Borohydride with Aqueous Solution of Ethylene Glycol in Presence of Catalytic Amount of $H_2SO_4$ with 50% Ethylene Glycol at 60° C.

In this example, a stirred mixture was prepared comprising 100 mg of sodium borohydride at 2.64 mmol and 50% by volume aqueous solution of ethylene glycol (0.6 ml, 5.29 mmol). The stirred mixture was then placed on a pre-heated oil bath at about 60° C. Then, a drop of 10% $H_2SO_4$ was added to the stirred mixture. Instant evolution of $H_2$ gas was observed. The reaction mixture was stirred at about 60° C. for about 15 minutes. The $H_2$ evolved was collected in an analytical gas burette. Yield of $H_2$ was quantitative. The hydrogen yield was as follows: about 50% $H_2$ was liberated in about 15 seconds, about 75% in about 1 minute, and about 100% in about 15 minutes.

EXAMPLE 19

In another example, a reaction of sodium borohydride and ethylene glycol in alcohol solution may be performed with a Lewis acid catalyst and tert-butanol. As a result, the resulting cyclic borate ester is recoverable quantitatively (about 100%) from tert-butanol as shown in equation 8.

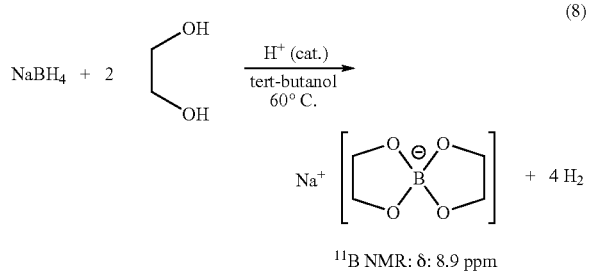

$^{11}$B NMR: δ: 8.9 ppm

EXAMPLE 20

Alcoholysis of Lithium Borohydride with Ethylene Glycol at Room Temperature

In this example, about 0.26 mL of Ethylene glycol at 4.6 mmol was added to about 500 mg of lithium borohydride (95% pure) at about 23 mmol. Hydrogen evolution initially began slowly. The reaction was exothermic and became vigourous after about 19 seconds. The reaction was complete in about 1 minute. The $H_2$ was collected in an analytical gas burette. Yield of $H_2$ was about 94%. The $^{11}$B NMR spectrum revealed a peak at δ 9.3 ppm.

Regeneration of Borohydride

The regeneration of a borohydride, e.g., sodium borohydride, from a borate compound, e.g., sodium tetraalkoxyborate, will now be discussed. An example of the present invention provides one method for regenerating a borohydride in accordance with one example of the present invention. The method includes preparing cyclic borate ester derived from alcoholysis of sodium borohydride. The cyclic borate ester provided in equation 7 is preferably used for the regeneration of sodium borohydride. Of course, any suitable cyclic borate ester may be used such as the cyclic borate esters (shown as molecules A, B, and C) produced when 1,3-propanediol, 2-butene-1,4-diol, and catechol, respectively, were used in the alcoholysis reaction.

The method further includes adding a hydride to the cyclic borate ester. In this example, the cyclic borate ester has at least about a 1:4 mole ratio in an ether solvent at between about 120 and 170 degree Celsius. The reaction is allowed to occur for between about 4 and 30 hours to provide regenerated sodium borohydride.

The cyclic borate ester is preferably sodium tetraalkoxyborate derived from alcoholysis of sodium borohydride. Preferably, the hydride is sodium hydride and the ether solvent is diglyme (diethylene glycol dimethyl ether). In this example, the sodium hydride is added to the sodium tetraalkoxyborate at about 1:6 mole ratio in about 0.35M diglyme solvent. The reaction is carried out preferably at about 150 degrees Celsius for about 24 hours to provide regenerated sodium borohydride.

Table 4 below shows (by $^{11}$B NMR) that regeneration of sodium borohydride (SBH) is obtainable from the sodium borate.

TABLE 4

Regeneration of SBH from Na[B(OCH$_2$CH$_2$O)$_2$]$^a$

| Entry | Hydride used | Temperature, ° C. | Time, h | Yield of SBH,$^b$ % |
|---|---|---|---|---|
| 1 | NaH | RT | 12 | 0 |
| 2 | NaH | 100 | 12 | 21 |
| 3 | NaH | 100 | 24 | 25 |
| 4 | NaH | 120 | 24 | 40 |
| 5 | NaH | 150 | 12 | 34$^c$ |
| 6 | LiH | Reflux | 24 | trace$^c$ |
| 7 | LiAlH$_4$ | RT | 2 | $^d$ |

$^a$All of the reactions were carried out in diglyme as solvent unless otherwise stated.
$^b$The amount of SBH was determined by hydrolysis with HCl. Excess metal hydride was quenched with tert-butanol.
$^c$There were several other products.
$^d$Major product showed a quartet in $^{11}$B NMR spectrum.

EXAMPLE 21

Regeneration of Sodium Borohydride: Reaction of NaB(OEt)$_4$ with LiH

This example provides a method for regenerating a borohydride. In this example, a suspension of 500 mg NaB(OEt)$_4$ at 2.34 mmol and 112 mg LiH at 14.04 mmol in 10 mL diglyme was prepared and refluxed for about 5 hours. The suspension became clear. The $^{11}$B NMR showed signals at δ −41.9 ppm (Li/NaBH$_4$) and −9.23 ppm (quartet, BH$_3$, major peak).

EXAMPLE 22

Recovery of NaBH$_4$ from NaB(—OCH$_2$CH$_2$O—)$_2$ Using NaH in Diglyme at 150° C.

In this example, a suspension of 535 mg NaB (—OCH$_2$CH$_2$O—)$_2$ at 3.47 mmol and 500 mg NaH at 20.83 mmol in 10 mL of diglyme was warmed at 150° C. for 12 hours. The reaction mixture showed $^{11}$B NMR signal corresponding to NaBH$_4$ at δ −41.64 ppm, along with other signals.

The reaction mixture was cooled to room temperature. The excess NaH was quenched with tert-butanol. The yield of NaBH$_4$ as determined by measuring the hydrogen evolved during the hydrolysis with diluted HCl was 34%.

The same reaction yielded 21% NaBH$_4$ at 100° C. for 12 hours and 25% after 24 h. The yield was 40% for a reaction at 120° C. for 24 hours.

EXAMPLE 23

Recovery of NaBH$_4$ from NaB(—OCH$_2$CH$_2$O—)$_2$ and LiH

In this example, a suspension of NaB(—OCH$_2$CH$_2$O—)$_2$ (500 mg, 3.25 mmol) and LiH (155 mg, 19.5 mmol) in diglyme (10 ml) was refluxed for 24 hours. The reaction mixture showed $^{11}$B NMR signal corresponding to Na/LiBH$_4$ at δ −40.98 ppm along with a signal at δ −8.99 ppm. But the major signal was due to the starting material at δ 7.64 ppm.

EXAMPLE 24

Recovery of NaBH$_4$ from NaB(—OCH$_2$CH$_2$O—)$_2$ and LiAlH$_4$

In this example, a suspension of NaB(—OCH$_2$CH$_2$O—)$_2$ (500 mg, 3.25 mmol) and LiAlH$_4$ (136 mg, 3.57 mmol) in THF (10 ml) was stirred at room temperature for 2 hours. The reaction mixture showed a peak in the $^{11}$B NMR spectrum at δ −43.73 ppm corresponding to Na/LiBH$_4$, along with a peak at −10.39 ppm.

EXAMPLE 25

Recovery of NaBH$_4$ from NaB(—OCH$_2$CH$_2$O—)$_2$ and NaAlH$_4$

In this example, a suspension of NaB(—OCH$_2$CH$_2$O—)$_2$ (500 mg, 3.25 mmol) and NaAlH$_4$ (193 mg, 3.57 mmol) in THF (10 mL) was stirred at room temperature for 24 h. The reaction mixture showed $^{11}$B NMR signal for NaBH$_4$ at −43.65 ppm along with a signal at −10.2 ppm.

It is to be noted that the chemicals used herein were purchased from Aldrich Chemical Company. Hydrogen measurements were performed using a gasimeter. $^{11}$B NMR spectra were plotted using a Varian Gemini 300 instrument. BF$_3$-Et$_2$O was used as external standard to determine the chemical shifts.

Regeneration of Borohydride with Aluminum Hydride

Another example of the present invention provides one method for regenerating a borohydride by reacting an aluminum hydride to a borate compound to provide a regenerated borohydride. The method includes preparing a borate compound, e.g., a cyclic borate ester. The borate compound is preferably derived from alcoholysis of a borohydride for generating hydrogen. The method further includes reacting aluminum hydride with the borate compound in a solvent to provide regenerated borohydride. Preferably the solvent is tetrahydrofuran at room temperature.

It is to be noted that the process of reacting aluminum hydride with the borate compound may include adding a hydride (e.g., lithium hydride or sodium hydride) and aluminum chloride to the borate compound. It has been unexpectedly found that merely adding the reactants from which aluminum hydride is derived (a hydride and aluminum chloride) produces aluminum hydride that reacts with the borate compound to produce regenerated borohydride. As a result, the process has been found to be more efficient, thereby reducing time and costs to the method of regenerating borohydride.

In one example as shown in equation 9, lithium borohydride is generated from a reaction of lithium borate complex with lithium aluminum hydride. In this example, lithium bis(ethyleneglycolate)borate complex (0.620 grams, 0.0045 moles) and lithium aluminum hydride (0.197 grams, 0.0049 moles)) are transferred to a round bottom flask under nitrogen atmosphere at room temperature. Preferably, tetrahydrofuran (20 ml) is then transferred to reaction mixture and the reaction is stirred at room temperature. The reaction is preferably monitored by $^{11}$B NMR spectroscopy. The reaction is completed in 42 hours. This reaction may be conducted with a dry ether solvent under the same conditions.

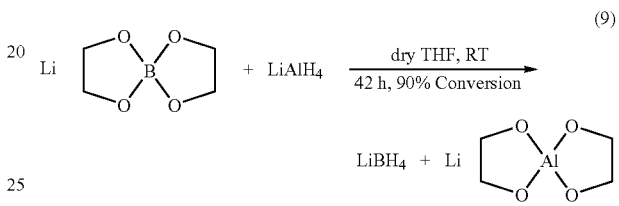

(9)

In another example as shown in equation 10, lithium borohydride is generated from a reaction of lithium borate with lithium hydride and aluminum chloride. In this example, lithium bis(ethyleneglycolate)borate complex (1.02 grams, 0.00739 moles) and Lithium hydride (0.249 grams, 0.029 moles) are transferred to a round bottom flask. Preferably, tetrahydrofuran (20 mL) is transferred to the reaction mixture and the reaction is stirred at 0-5° C. for 15 minutes. Solid aluminum chloride (0.985 grams, 0.00739 moles) is then transferred to the reaction mixture under nitrogen atmosphere and the reaction mixture is stirred at room temperature. The reaction is preferably monitored by $^{11}$B NMR. The reaction was complete in 18 hours.

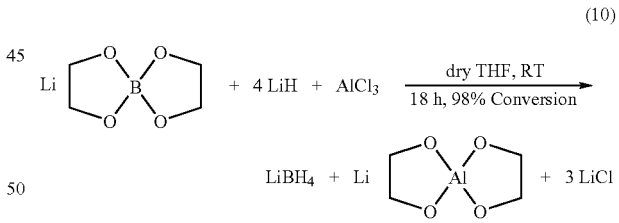

(10)

EXAMPLE 26

Generation of LiBH$_4$: Reaction of Lithium Borate with Lithium Aluminum Hydride In this example as shown in equation 11, lithium bis(ethyleneglycolate)borate complex (0.6 g, 0.0043 moles) and Lithium aluminum hydride (0.191 g, 0.0047 moles) were transferred to a round bottom flask under nitrogen atmosphere at room temperature. Tetrahydrofuran (20 ml) was transferred to reaction mixture and the reaction was stirred under reflux. The reaction was monitored by $^{11}$B NMR. The reaction was completed in 2 hours.

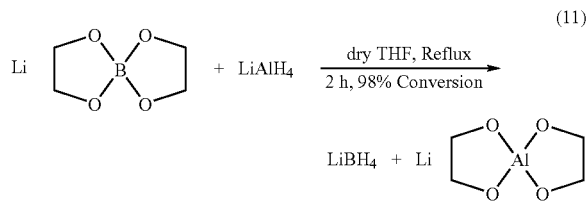

(11)

EXAMPLE 27

Generation of LiBH$_4$: Reaction of Lithium Borate with Lithium Hydride and Aluminum Chloride In this example as shown in equation 12, lithium bis(ethyleneglycolate)borate complex (0.758 g, 0.00549 moles) and Lithium hydride (0.185 g, 0.0219 moles) were transferred to a round bottom flask. Tetrahydrofuran was transferred to reaction mixture and the reaction was stirred at 0-5° C. for 15 minutes. Solid aluminum chloride (0.732 g, 0.00549 moles) was transferred to the above flask under nitrogen atmosphere and the reaction mixture was refluxed. The reaction was monitored by $^{11}$B NMR. The reaction was complete in one hour.

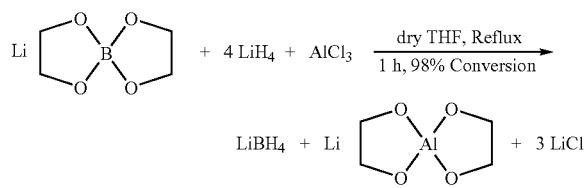

(12)

EXAMPLE 28

Generation of LiBH$_4$: Reaction of Lithium Borate with Lithium Hydride and Aluminum Chloride In this example as shown in equation 13, lithium borohydride was generated by using the six membered Lithium bis(1,3-popanediolate)borate complex with lithium aluminum hydride. Lithium borate complex (0.524 g, 0.00315 moles) and lithium aluminum hydride (0.151 g, 0.00378 moles) were transferred to round bottom flask under nitrogen atmosphere at room temperature. Tetrahydrofuran (20 ml) was transferred to reaction mixture and the reaction was stirred under reflux. The reaction was monitored by $^{11}$B NMR. The reaction was complete in 7 hours.

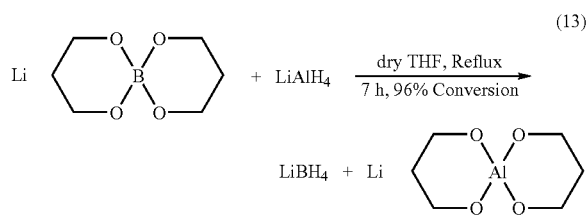

(13)

EXAMPLE 29

Generation of NaBH$_4$: Reaction of Sodium Borate Complex with Sodium Aluminum Hydride In this example as shown in equation 14, sodium bis(ethyleneglycolate)borate complex (0.75 g, 0.0048 moles) and sodium aluminum hydride (0.289 g, 0.00536 moles) were transferred to round bottom flask under nitrogen atmosphere at room temperature. Tetrahydrofuran (20 ml) was transferred to reaction mixture and the reaction was stirred at room temperature. The reaction was monitored by $^{11}$B NMR. The reaction was complete in 76 hours.

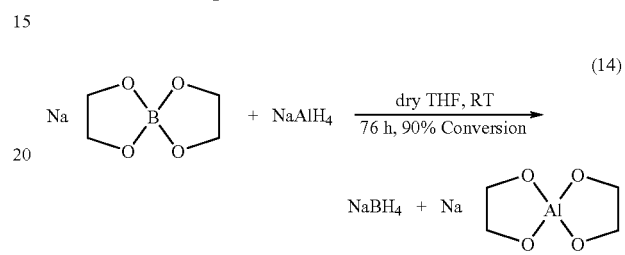

(14)

EXAMPLE 30

Generation of NaBH$_4$: Reaction of Sodium Borate Complex with Sodium Aluminum Hydride In this example as shown in equation 15, sodium bis(ethyleneglycolate)borate complex (0.74 g, 0.0048 moles) and sodium aluminum hydride (0.31 g, 0.0057 moles) were transferred to round bottom flask under nitrogen atmosphere at room temperature. Tetrahydrofuran (20 ml) was transferred to reaction mixture and the reaction was stirred at reflux conditions. The reaction was monitored by $^{11}$B NMR. The reaction was complete in 4-6 hours.

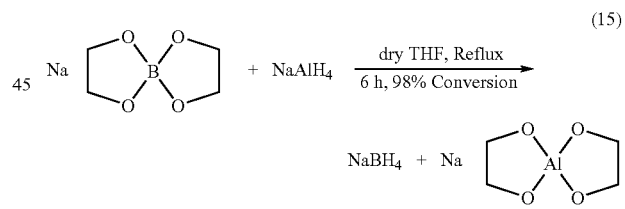

(15)

EXAMPLE 31

Generation of LiBH$_4$: Reaction of Trimethyl Borate with Lithium Hydride and Aluminum Chloride In this example as shown in equation 16, lithium hydride (0.154 g, 0.0192 moles) was transferred to round bottom flask under nitrogen atmosphere at room temperature. Tetrahydrofuran (20 ml) was transferred to reaction mixture and cooled to 0-5° C. and trimethyl borate (0.5 g, 0.0048 moles) was added slowly over a period of 5 minutes at the same temperature. Solid aluminum chloride (0.642 g, 0.0048 moles) was added to the reaction mixture at a time. The reaction was allowed to stir at room temperature. The reaction was monitored by $^{11}$B NMR. The reaction was complete in 18 hours.

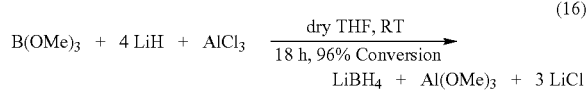

(16)

EXAMPLE 32

Generation of $LiBH_4$: Reaction of Trimethyl Borate with Lithium Hydride and Aluminum Chloride As shown in equation 17, lithium hydride (0.154 g, 0.0192 moles) was transferred to round bottom flask under nitrogen atmosphere at room temperature. Tetrahydrofuran (20 ml) was transferred to reaction mixture and cooled to 0-5° C. and the Trimethyl borate (0.5 g, 0.0048 moles) was added slowly over a period of 5 minutes at the same temperature and stirred for 15 mins. The Solid Aluminum chloride (0.642 g, 0.0048 moles) was added at a time. The reaction was allowed to stir under reflux conditions. The reaction was monitored by $^{11}B$ NMR. The reaction went to 90% complete in 8 hours.

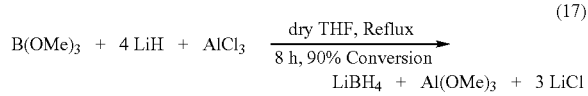

(17)

EXAMPLE 33

Generation of $NaBH_4$: Reaction of Trimethyl borate with Sodium hydride and Aluminum chloride In this example as shown in equation 18, sodium hydride (0.462 g, 0.019 moles) was transferred to round bottom flask under nitrogen atmosphere. Tetrahydrofuran was transferred to reaction mixture and the reaction was stirred for 15 minutes. Trimethyl borate (0.5 g, 0.0048 moles) was added slowly over a period of 5 minutes at room temperature and stirred for 30 minutes. Solid aluminum chloride (0.642 g, 0.0048 moles) dissolved in THF (6 ml) and slowly added to reaction mixture for about 10 minutes. The reaction mixture was stirred at room temperature. The reaction was monitored by $^{11}B$ NMR, based on NMR the conversion is 50% in 24 hours.

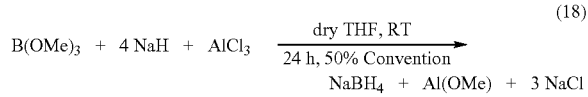

(18)

EXAMPLE 34

Generation of $NaBH_4$: Reaction of Trimethyl borate with Sodium hydride and Aluminum chloride In this example as shown in equation 19, sodium hydride (0.462 g, 0.019 moles) was transferred to round bottom flask under nitrogen atmosphere. Tetrahydrofuran was transferred to the reaction mixture and the reaction was stirred for 15 minutes. Trimethyl borate (0.5 g, 0.0048 moles) was added slowly over a period of 5 minutes at room temperature and stirred for 30 minutes. Solid aluminum chloride (0.642 g, 0.0048 moles) dissolved in THF (6 ml) was slowly added to reaction mixture for about 10 minutes. The reaction mixture was stirred under reflux conditions. The reaction was monitored by $^{11}B$ NMR. The reaction was ~80% complete within 16 h. Increasing the reaction temperature by conducting the reaction in dry diglyme at 120° C. revealed almost complete (90%) reaction and the formation of sodium borohydride within 12 h.

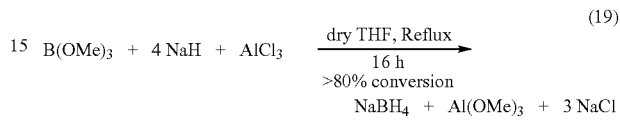

(19)

EXAMPLE 35

Generation of $LiBH_4$ from Boric Oxide

(20)

In this example as shown in equation 20, a suspension of Lithium aluminium hydride (125 mg, 3.3 mmoles) in anhydrous THF (20 mL) under ice-cooling was added solid $B_2O_3$ (114.5 mg, 1.64 mmoles) and stirred for 4 hours during which the reaction mixture warmed upto ambient temperature. The reaction was monitored by $^{11}B$ NMR spectroscopy which indicated the presence of $BH_4^-$. The molarity of the resulting solution was 0.16 M.

EXAMPLE 36

Generation of $LiBH_4$ from Boric Oxide

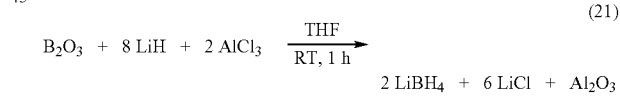

(21)

In this example as shown in equation 21, a suspension of LiH (144 mg 18 mmoles) in anhydrous THF (16 mL) under ice-cooling was added dropwise over a period of ten minutes a THF (4 mL) solution of $AlCl_3$ (598.5 mg, 4.5 mmoles). The resulting mixture was strirred for 15 minutes. This is followed by addition of solid $B_2O_3$ (156.6 mg, 2.25 mmoles). The heterogenous reaction mixture was stirred for 1 hour during which time it warmed upto ambient temperature. A $^{11}B$ NMR spectrum of an aliquot indicated the formation of $LiBH_4$. The molarity of the solution of $LiBH_4$ was 0.23 M.

EXAMPLE 37

Generation of $LiBH_4$ from Boric Oxide

A suspension of LiH (144 mg 18 mmoles) in anhydrous THF (16 mL) under ice-cooling was added to $AlCl_3$ (598.5 mg, 4.5 mmoles). The resulting mixture was stirred one hour. This is followed by addition of solid $B_2O_3$ (156.6 mg, 2.25 mmoles). The heterogenous reaction mixture was stirred for additional one hour during which it warmed upto ambient temperature and monitored by $^{11}B$ NMR spectroscopy which indicated presence of $BH_4$. Formation of Lithium borohydride was also observed when solid $AlCl_3$ was used in the reaction.

While the present invention has been described in terms of preferred embodiments, it will be understood, of course, that the invention is not limited thereto since modifications may be made to those skilled in the art, particularly in light of the foregoing teachings.

The invention claimed is:

1. A method of generating hydrogen from a borohydride and regenerating the borohydride, the method comprising:
    preparing at least about 5% volume of a diol in alcohol solution with at least about 0.001% volume of a catalyst to form a diol-catalyst mixture;
    adding the borohydride to the diol-catalyst mixture at a predetermined mole ratio to provide alcoholysis of the borohydride, generating the hydrogen, wherein a borate compound is derived from the alcoholysis of the borohydride; and
    adding a hydride to the borate compound in diglyme solvent to regenerate sodium borohydride.

2. The method of claim 1 wherein the borohydride is sodium borohydride, the borate compound is sodium tetraalkoxyborate, and the hydride is sodium hydride, and
    wherein the step of adding the borohydride includes preparing the sodium tetraalkoxyborate derived from alcoholysis of the sodium borohydride.

3. The method of claim 2 wherein the step of adding the hydride includes adding the sodium hydride to the sodium tetraalkoxyborate at about 1:6 mole ratio in about 0.35M of the diglyme solvent at about 150° Celsius for about 24 hours to regenerate the sodium borohydride.

4. A method of generating hydrogen from a borohydride and regenerating the borohydride, the method comprising:
    preparing at least about 5% volume of diol in alcohol solution with at least about 0.001% volume of catalyst to form a diol-catalyst mixture;
    adding the borohydride to the diol-catalyst mixture at a predetermined mole ratio to provide alcoholysis of the borohydride, generating the hydrogen, wherein a borate compound is derived from the alcoholysis of the borohydride; and
    reacting an aluminum hydride to the borate compound in a solvent to provide regenerated borohydride.

5. The method of claim 4 wherein the borate compound is a cyclic borate ester, and
    wherein the step of reacting includes adding the aluminum hydride to the cyclic borate ester of at least about 1:1 mole ratio in the solvent at about room temperature for between about 2 and 50 hours to provide the regenerated borohydride.

6. The method of claim 4 wherein the borate compound is lithium tetraalkoxyborate, the borohydride is lithium borohydride, and the solvent is tetrahydrofuran, and
    wherein the step of reacting includes adding lithium aluminum hydride to the lithium tetraalkoxyborate at about 1:1 mole ratio in between about 0.2 M and 0.3 M tetrahydrofuran solvent at about room temperature for about 2 hours to regenerate the lithium borohydride.

7. The method of claim 4 wherein the borate compound is a cyclic borate ester and wherein the step of reacting includes adding a hydride and aluminum chloride to the cyclic borate ester of at least about 4:1:1 mole ratio in the solvent at about room temperature for between about 1 and 20 hours to provide the aluminum hydride and the regenerated borohydride.

8. The method of claim 4 wherein the borate compound is lithium tetraalkoxyborate, the borohydride is lithium borohydride, and the solvent is tetrahydrofuran, and
    wherein the step of reacting includes adding lithium hydride and aluminum chloride to the lithium tetraalkoxyborate at about 4:1:1 mole ratio in between about 0.2 M and 0.3 M tetrahydrofuran solvent at about room temperature about 1 hour to provide aluminum hydride and regenerate lithium borohydride.

9. The method of claim 4 wherein the borate compound is a cyclic borate complex and the solvent is tetrahydrofuran, and
    wherein the step of reacting includes adding the aluminum hydride to the cyclic borate complex of at least about 1:1 mole ratio in the tetrahydrofuran solvent at about room temperature for about 7 hours to provide the regenerated borohydride.

10. The method of claim 4 wherein the borohydride is lithium borohydride, the borate compound is lithium borate complex, and the solvent is tetrahydrofuran and,
    wherein the step of reacting includes adding lithium aluminum hydride to the lithium borate complex at about 1:1 mole ratio in between about 0.2 M and 0.3 M tetrahydrofuran solvent at about room temperature for about 7 hours to regenerate lithium borohydride.

11. The method of claim 4 wherein the borate compound is a cyclic borate ester and the solvent is tetrahydrofuran, and
    wherein the step of reacting includes adding aluminum hydride to the cyclic borate ester of at least about 1:1 mole ratio in the tetrahydrofuran solvent at about room temperature for between about 6 and 80 hours to provide the regenerated borohydride.

12. The method of claim 4 wherein the borate compound is sodium tetraalkoxyborate, the borohydride is sodium borohydride, and the solvent is tetrahydrofuran, and
    wherein the step of reacting includes adding sodium aluminum hydride to the sodium tetraalkoxyborate at about 1:1 mole ratio in between about 0.2 M and 0.3 M tetrahydrofuran solvent at about room temperature for about 6 hours to regenerate sodium borohydride.

13. The method of claim 4 wherein the borate compound is trialkyl borate and the solvent is tetrahydrofuran, and
    wherein the step of reacting includes adding a hydride and aluminum chloride to trialkyl borate of at least about 4:1:1 mole ratio in tetrahydrofuran solvent at about room temperature for between about 8 and 20 hours to provide the aluminum hydride and the regenerated borohydride.

14. The method of claim 4 wherein the borate compound is trimethyl borate, the borohydride is lithium borohydride, and the solvent is tetrahydrofuran, and
    wherein the step of reacting includes adding lithium hydride and aluminum chloride to the trimethyl borate at about 4:1:1 mole ratio in between about 0.2 M and 0.3 M tetrahydrofuran solvent at about room temperature for about 18 hours to provide aluminum hydride and to regenerate lithium borohydride.

15. The method of claim 4 wherein the borate compound is trialkyl borate, the borohydride is sodium borohydride, and the solvent is tetrahydrofuran, and
    wherein the step of reacting includes adding sodium hydride and aluminum chloride to trialkyl borate of at least about 4:1:1 mole ratio in tetrahydrofuran solvent at about room temperature for between about 16 and 24 hours to regenerate sodium borohydride.

16. The method of claim 4 wherein the borohydride is sodium borohydride, the borate compound is trimethyl borate, and the solvent is tetrahydrofuran, and wherein the step of reacting includes adding sodium hydride and aluminum chloride to trimethyl borate at about 4:1:1 mole ratio in between about 0.2 M and 0.3 M tetrahydrofuran solvent at about room temperature for about 16 hours to regenerate sodium borohydride.

* * * * *

UNITED STATES PATENT AND TRADEMARK OFFICE
CERTIFICATE OF CORRECTION

| | | |
|---|---|---|
| PATENT NO. | : 7,601,797 B2 | Page 1 of 1 |
| APPLICATION NO. | : 11/125796 | |
| DATED | : October 13, 2009 | |
| INVENTOR(S) | : Ramachandran et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1151 days.

Signed and Sealed this

Fifth Day of October, 2010

David J. Kappos
*Director of the United States Patent and Trademark Office*